United States Patent
Kai

(10) Patent No.: US 7,053,816 B2
(45) Date of Patent: May 30, 2006

(54) ON-VEHICLE RADAR SYSTEM

(75) Inventor: Koichi Kai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/837,589

(22) Filed: May 4, 2004

(65) Prior Publication Data

US 2005/0168377 A1 Aug. 4, 2005

(30) Foreign Application Priority Data

Feb. 4, 2004 (JP) ............................. 2004-028474

(51) Int. Cl.
*G01S 13/00* (2006.01)
(52) U.S. Cl. .................. 342/70; 342/128; 342/134
(58) Field of Classification Search ................ 342/70
See application file for complete search history.

(56) References Cited

U.S. PATENT DOCUMENTS

| | | | | |
|---|---|---|---|---|
| 6,266,004 B1 * | 7/2001 | Pannert et al. | ................ | 342/70 |
| 6,317,076 B1 * | 11/2001 | Ameen et al. | ............... | 342/174 |
| 6,384,768 B1 * | 5/2002 | Kai | ............... | 342/70 |
| 6,831,595 B1 * | 12/2004 | Isaji | ............... | 342/173 |
| 2004/0095269 A1 * | 5/2004 | Uehara et al. | ............... | 342/92 |

FOREIGN PATENT DOCUMENTS

| | | |
|---|---|---|
| JP | 2001-264426 A | 9/2001 |
| JP | 2003-043137 A | 2/2003 |

* cited by examiner

*Primary Examiner*—Thomas H. Tarcza
*Assistant Examiner*—Matthew Barker
(74) *Attorney, Agent, or Firm*—Sughrue Mion, PLLC

(57) ABSTRACT

An on-vehicle radar system capable of detecting a range error from range data based on an echo from a target (6). Range error is detected when amplitudes of beat frequency components in two adjacent range gates are substantially equal. The system includes a transmitting unit (1, 2, 4, 5) for radiating a modulated wave having frequency increasing and decreasing repetitively after pulse modulation, a receiving unit (8, 9, 10, 11, 12) for receiving the echo, and an arithmetic unit (13) for detecting a range error ascribable to aberration of modulation band width due to frequency increase and decrease of transmission wave (W1) by comparing a range corresponding to the range gate with that determined from a frequency difference between transmission wave and echo. The arithmetic unit (13) detects the range error on the basis of frequency difference components having substantially same amplitudes in adjacent range gates.

11 Claims, 4 Drawing Sheets

ON-VEHICLE RADAR SYSTEM

BACKGROUND OF THE INVENTION

1. Field of the Invention

The present invention relates to an on-vehicle radar system (i.e., radar system installed on a motor vehicle) which is implemented on the basis of an FM pulse Doppler radar. Further, the present invention also relates to an on-vehicle radar system whose operation mode can be changed over between a pulse operation mode and an FMCW (Frequency Modulation Continuous Wave) operation mode at an appropriate timing. More particularly, the present invention is concerned with an on-vehicle radar system which is imparted with a function for arithmetically determining a range correcting value with a high accuracy regardless of the width of range gate which may be set to an optional valve.

2. Description of Related Art

As a hitherto known or conventional on-vehicle radar system, there may be mentioned the one which is implemented on the basis of an FM (Frequency Modulation) pulse Doppler radar. For more particulars, reference may have to be made to e.g. Japanese Patent Application Laid-Open Publication No. 264426/2001 (JP-A-2001-264426).

The conventional on-vehicle radar system is comprised of a vehicle velocity sensor for determining the traveling speed of the motor vehicle equipped with the radar system (hereinafter referred to as the concerned motor vehicle only for the convenience of description), a modulation control voltage generator, a voltage-controlled oscillator for generating an electromagnetic wave signal having a transmission frequency on the order of 76 GHz to 77 GHz, a transmission/reception changeover switch for changing over the electromagnetic wave power supplied to the transmitting amplifier or the mixer for reception, a transmitting amplifier for amplifying the electromagnetic wave power to a transmitting amplifier or a mixer for reception, a transmitting antenna for radiating the amplified electromagnetic wave into space, a receiving antenna for receiving a reflection wave (echo signal) of the electromagnetic wave radiated and reflected on a target (object to be detected), a receiving amplifier for amplifying the received electromagnetic wave signal, a mixer for mixing the radiated electromagnetic wave signal and the reflected electromagnetic wave signal to thereby generate as the output thereof a beat signal indicative of a range (or distance) to the target and a relative velocity thereof, a low-pass filter for converting a cut-off frequency to the reciprocal of a pulse time duration (i.e., pulse width) of the transmitted electromagnetic wave signal, an AGC (Automatic Gain Control) amplifier for adjusting or controlling the gain in dependence on the received power of the reflection wave (echo signal), an A/D (Analog-to-Digital) converter for converting the beat signal to a digital signal, and a range arithmetic module (or range/relative velocity arithmetic module) for arithmetically determining a range to the target as well as the relative velocity thereof on the basis of the digital value of the beat signal resulting from the A/D conversion.

The range arithmetic module includes a range correcting module designed for correcting the range to the target arithmetically determined on the basis of the range to the target and the relative velocity thereof, the range gate and the velocity of the concerned motor vehicle.

Next, description will be made of the electromagnetic wave transmitting/receiving operation of the conventional on-vehicle radar system implemented in the structure described above.

The voltage-controlled oscillator is designed to output the electromagnetic wave signal modulated in conformance with a voltage signal supplied from the modulation control voltage generator. The modulated electromagnetic wave signal is fed to the transmitting amplifier by way of the transmission/reception changeover switch to be thereby amplified and radiated into space through the medium of the transmitting antenna.

In succession, at a time point corresponding to the time lapse of a pulse duration of e.g. 33.3 ns (=1/30 MHz, which corresponds to the range of 5 m) from the time point at which radiation of the electromagnetic wave into space was started, the transmission/reception changeover switch is changed over to the receiving mode or state, as the result of which the voltage-controlled oscillator and the mixer are connected to each other.

The electromagnetic wave radiated into space from the transmitting antenna is in the form of pulses each having the duration (time width) of 33.3 ns. The electromagnetic pulse wave is reflected at a target distanced from the concerned motor vehicle for a certain range or distance to be received by the on-vehicle radar system. More specifically, the received electromagnetic pulse wave (echo signal) caught by the receiving antenna with a delay time which depends on the range to the target relative to the radiation or transmission of the electromagnetic wave.

In the case where the target is moving relative to the concerned motor vehicle, i.e., when the target is traveling at a relative velocity, the frequency of the received electromagnetic wave signal (echo signal) is inputted to the receiving antenna, being shifted from the frequency of the transmitted electromagnetic wave signal by a predetermined frequency corresponding to the relative velocity of the target under the influence of the Doppler effect.

The electromagnetic wave signal inputted through the receiving antenna is amplified by the receiving amplifier to be subsequently mixed with the transmitted electromagnetic wave signal supplied from the voltage-controlled oscillator by means of the mixer, whereby the beat signal is outputted from the mixer.

The beat signal thus acquired is then forced to pass through the filter having the cut-off frequency of e.g. 30 MHz, as a result of which a signal having a frequency component equivalent to a frequency difference between the frequency of the transmitted electromagnetic wave signal and that of the reflected wave signal (echo) is made available. This signal is referred to as the beat frequency signal. The beat frequency signal is then amplified by the AGC amplifier to be inputted to the A/D converter and converted to a digital signal.

In succession, in the range arithmetic module, the range to the target and the relative velocity thereof are arithmetically determined on the basis of the output data of the A/D converter (i.e., digital data of the beat signal resulting from the A/D conversion). This arithmetic processing procedure will be elucidated below.

For the simplification of elucidation, it is assumed that frequency modulation is not performed by the voltage-controlled oscillator and that the frequency of the transmission signal is 76.5 GHz.

In the case where a predetermined velocity resolution (=1 km/h) is to be acquired, the resolution $\Delta f$ of the Doppler frequency is determined in accordance with the undermentioned expression (1):

$$\Delta f = \frac{2\Delta v}{\lambda} \quad (1)$$
$$= \frac{2 \times 0.2777 \text{ m/s}}{0.003921 \text{ m}}$$
$$= 141.64 \text{ (Hz)}$$
$$= \frac{1}{7.05977 \text{ (ms)}} = \frac{1}{Tm}$$

As is obvious from the above expression (1), a measuring time Tm of 7.06 ms is required.

At this juncture, let's assume that the maximum measurable range is e.g. 150 m. Then, the transmission wave output period is 33.3 ns×30 (=1 µs). Accordingly, for realizing the velocity resolution of "1 km/h", it is necessary to acquire the transmission wave outputs on a range-gate base (corresponding to 7060 outputs) and perform the FFT (Fast Fourier Transform) arithmetic on all the data of the beat signals in every range gate. Through this procedure, the Doppler shift in the range gate corresponding to the detection time point can be determined.

In this conjunction, the range Rg to the target and the relative velocity V thereof can arithmetically be determined in accordance with the undermentioned expressions (2) and (3), respectively.

$$Rg = \frac{tg \times n \times C}{2} \quad (2)$$

$$V = \frac{fb1 \times C}{2 \times f0} \quad (3)$$

where tg represents the time width of the range gate (pulse time width), n represents the ID (identifier) number of the range gate,
C represents the velocity of light,
fb1 represents the beat frequency, and
f0 represents the transmission frequency (=76.5 GHz).

At this juncture, in consideration of the fact that the transmitted electromagnetic wave signal whose frequency is so modulated as to repetitively increase and decrease, it is assumed that during the measuring period Tm (=7.06 ms), the transmission frequency increases at a constant rate from 76.425 GHz to 76.575 GHz in the band width B (=150 MHz).

In that case, the round-trip time t taken for the electromagnetic wave signal radiated from the transmitting antenna to be caught by the receiving antenna after having been reflected at the target can be determined in accordance with the undermentioned expression (4):

$$t = \frac{\text{range} \times 2}{C} \quad (4)$$

Since the transmission frequency increases during the round-trip time period t, the beat frequency fbu is determined as a sum of the frequency difference fb2 between the transmission frequency and the reception frequency which difference depends on the distance and the Doppler frequency fb1 ascribable to the relative velocity of the target, as given by the following expression (5):

$$fbu = fb2 + fb1 \quad (5)$$

Next, it is assumed that during the succeeding measuring period Tm (=7.06 ms), the transmitted signal frequency decreases or lowers at a predetermined constant rate from 76.425 GHz to 76.575 GHz in the band width B (=150 MHz).

In this case, since the transmission frequency decreases during the round-trip time t taken for the electromagnetic wave signal radiated from the transmitting antenna to be caught by the receiving antenna after reflection at the target, the beat frequency fbd is represented by a sum of the frequency difference fb2' between the transmitted frequency and the received frequency which difference depends on the range and the Doppler frequency fb1' ascribable to the relative velocity of the target.

Incidentally, the range and the relative velocity during the frequency decreasing (i.e., in the frequency decreasing pulse, to say in another way) may duly be regarded as being equal to those when the frequency is increasing (i.e., in the frequency increasing phase). Further, the constant frequency increasing rate is equal to the constant frequency decreasing rate. Consequently, it can duly be regarded that fb1=fb1' and that fb2'=−fb2. Thus, the beat frequency fbd during the frequency decreasing or lowering can be given by the following expression (6):

$$fbd = fb2' + fb1' = -fb2 + fb1 \quad (6)$$

As is obvious from the above, by increasing and decreasing the transmission frequency to thereby determine the beat frequencies fbu and fbd, respectively, the frequency difference fb2 between the transmission frequency and the reception frequency which difference depends on the range to the target and the Doppler frequency fb1 ascribable to the relative velocity thereof can be determined, respectively, in accordance with the following expressions (7):

$$fb1 = \frac{fbu + fbd}{2}, \quad fb2 = \frac{fbu - fbd}{2} \quad (7)$$

In this conjunction, it is noted that since the frequency difference fb2 represents the frequency increase or frequency decrease during the round-trip time t determined in accordance with the expression (4), the relation given by the undermentioned expression (8) applies valid:

$$\frac{fb2}{B} = \frac{t}{Tm} \quad (8)$$

From the expressions (4) and (8), the distance or range Rb from the concerned motor vehicle to the target can be determined on the basis of the frequency difference fb2 in accordance with the following expression (9):

$$Rb = \frac{Tm \times C}{2 \times B} \times fb2 \quad (9)$$

Further, the relative velocity V of the target can be determined on the basis of the Doppler frequency fb1 in accordance with the expression (3) mentioned previously.

From the expression (9), it can be seen that the range Rb and the frequency difference fb2 bear a proportional relation to each other. Accordingly, the range resolution ΔR can be given by the following expression (10):

$$\Delta R = \frac{Tm \times C}{4 \times B} \Delta f = \frac{C}{2 \times B} \quad (10)$$

where $\Delta f (=1/(Tm/2))$ represents the frequency resolution of the frequency difference fb2 between the transmission frequency and the reception frequency.

In the expression (10), when the band width B=300 MHz, the range resolution ΔR is then "0.5 m", which means that the range resolution is improved over that of the range Rg determined in accordance with the expression (2) mentioned previously.

Further, even when noise is generated for some cause, as a result of which beat frequency ascribable to the noise is detected in a given range gate, the noise component can be eliminated from the detected data so far as the error or difference between the range Rg determined in accordance with the expression (2) and the range Rb determined in accordance with the expression (9) is not smaller than the width (=5 m) of the range gate.

By way of example, let's assume that the range to the target object is 52 m and that the relative velocity of the target is "0" km/h, the range determined in accordance with the expression (2) is "50 m" while the range Rb determined in accordance with the expression (9) is "52 m".

In this conjunction, it is again assumed that error occurs in the voltage applied to the voltage-controlled oscillator due to variance among the elements, temperature change and/or for other cause, the error being given by "voltage applied to the voltage-controlled oscillator"–"voltage of the oscillation frequency resulting from the conversion", and that the band width B changes by a factor of "0.9" due to the error, the range Rg determined in accordance with the expression (2) is then "50 m", whereas the range Rb determined in accordance with the expression (9) is "52/0.9 (≈58 m)".

In the case where error makes appearance between the range Rg determined in accordance with the expression (2) and the range Rb determined in accordance with the expression (9), it is impossible to discern whether the range error is ascribable to the noise mentioned previously or the range error has actually taken place.

Under the circumstances, by taking it into consideration that when it is decided that the velocity of the concerned motor vehicle is "0" km/h (e.g. when the concerned motor vehicle is stopping in the engine operation starting state), then the relative velocities of stationary objects in the surroundings are "0" km/h and that many of the targets in the surroundings are stationary, the range correcting module is so designed as to select the target whose relative velocity is "0" km/h from the detected targets and make decision that error has been brought about in the band width B when the difference between the ranges Rg and Rb determined in accordance with the expressions (2) and (9), respectively, become greater than the range gate width (=5 m) inclusive.

As is apparent from the above, when the range to the target is 52 m with the relative velocity of the target being "0" km/h, the range Rb determined in accordance with the expression (2) is "58 m". However, determining the range gate ID number n inversely from the range Rb, then n=11 from the expression (2).

However, the ID number n of the actually detected range gate is "10". Accordingly, the correcting value k in this case can be determined as follows:

$$k = \frac{10}{11} \quad (11)$$

The range error can be reduced by correcting the range Rb determined in accordance with the expression (2) by using the above-mentioned correcting value k in accordance with the undermentioned expression (12):

$$Rf' = Rf \times k = 58 \times \frac{10}{11} \approx 53 \text{ m} \quad (12)$$

Next, description will be directed to the processing procedure for arithmetically determining or computing the range correcting value in the conventional on-vehicle radar system described above.

The arithmetic processing routine for computing the range correcting value is called from a main control processing procedure periodically at a predetermined interval.

When the velocity of the concerned motor vehicle is greater than "0" km/h, the main control processing procedure is resumed without executing the arithmetic processing routine. On the other hand, when the velocity of the concerned motor vehicle is "0" km/h, the range gate of interest is initialized to a minimum range gate.

In succession, when the range gate condition is such that "range gate of interest">"final range gate", the arithmetic processing routine is terminated, whereas when "range gate of interest"≦"final range gate", check flags for all the beat frequency components fbu[i] (i=0, 1, . . . ) in the frequency increasing phase within the range gate of interest are reset.

Subsequently, when all the beat frequency components fbu[i] in the frequency increasing phase have been checked, then the range gate of interest is incremented by "+1", whereon the decision processing for the range gate condition mentioned previously is resumed.

On the other hand, unless all the beat frequency components fbu[i] in the frequency increasing phase have been checked, one unchecked component is selected from the beat frequency components fbu[i], whereon the check flag for the selected unchecked component is set to the state indicating "checked".

Thereafter, the check flags for all the beat frequency components fbd[j] (j=0, 1, 2, . . . ) in the frequency decreasing phase within the range gate of interest are reset. When all the beat frequency components fbd[j] have been checked, the check/uncheck decision processing for the beat frequency components fbu[i] in the frequency increasing phase is resumed.

On the other hand, unless all the beat frequency components fbd[j] in the frequency decreasing phase have been checked, one unchecked component is selected from the beat frequency components fbd[j], whereon the check flag for the selected unchecked component is set to the state indicating "checked".

In succession, the range Rb and the relative velocity V are arithmetically determined on the basis of the beat frequency components fbu[i] in the frequency increasing phase and the beat frequency components fbd[j] in the frequency decreasing phase in accordance with the expressions (3), (7), (8) and (10) mentioned hereinbefore.

Subsequently, unless the conditions that the range Rb is of positive or plus polarity and that the relative velocity V is "0" km/h are satisfied, the check/uncheck decision processing for the beat frequency components fbd[j] in the frequency decreasing phase is resumed.

On the other hand, when the range Rb is of plus polarity and when the relative velocity V is "0" km/h, the range Rg is computed on the basis of the range gate of interest in accordance with the expression (2) to be stored in an array of computation results of the range correcting values as an N-th computed range correcting value k[N].

Thereafter, the number N of times the range correcting value has been computed is incremented by "1", and N range correcting values k[i] (i=1, 2, . . . , N) are averaged to thereby calculate a smoothed range correcting value, whereon the check/uncheck decision processing for the beat frequency components fbd[j] in the frequency decreasing phase is resumed.

Incidentally, the number N of times the range correcting value is computed and the range correcting value k[i] are initialized in advance in the main control processing.

In the conventional on-vehicle radar system, the range correcting values k[i] are arithmetically determined on the basis of the ranges Rb and Rg, respectively. In this conjunction, it is noted that since the range Rb is determined from the target located within the range of the range gate width, there always exist variances of the range Rb within the range of the range gate width. Under the circumstances, so far as the variances within the range of the range gate width are uniform, the range correcting value can be arithmetically determined with a reasonably high accuracy. However, in the actual environments, the variances mentioned above are not always uniform. As a result of this, there may arise the possibility that the range correcting value k[i] contains an error which corresponds to the range gate width, giving rise to a problem.

Certainly, it can be conceived to enhance the accuracy of the range correcting value by setting narrow the pulse width (i.e., range gate). In that case, however, S/N ratio of the received signal (echo) is degraded as the pulse width becomes narrower, which results in that probability of the target detection becomes low, incurring another problem.

Further, the vehicle velocity information derived from the output of the vehicle velocity sensor is required for computing the range correcting value, which makes it difficult to reduce the manufacturing cost of the on-vehicle radar system, involving still another problem.

SUMMARY OF THE INVENTION

In the light of the state of the art described above, it is an object of the present invention to solve the problems such as pointed out above by providing an improvement of the on-vehicle radar system such that the range correcting value can arithmetically be determined with an enhanced accuracy for a given or optional value of the range gate width without need for using the vehicle velocity information.

In view of the above and other objects which will become apparent as the description proceeds, there is provided according to a first aspect of the present invention an on-vehicle radar system incorporating an FM pulse Doppler radar installed on a motor vehicle for detecting a range extending from the motor vehicle to a target. The on-vehicle radar system mentioned above includes a transmitting means for radiating as a transmission wave a modulated wave having a frequency increasing and decreasing repetitively after pulse modulation, a receiving means for receiving as a reception wave a reflection wave resulting from reflection of the transmission wave at the target in every range gate set at a same interval as a pulse width of the transmission wave, and an arithmetic means for detecting a range error ascribable to aberration of modulation band width brought about by the frequency increasing and decreasing of the transmission wave by comparing a range corresponding to the range gate with a range determined on the basis of a frequency difference between a frequency of the transmission wave and a frequency of the reception wave.

In the radar system mentioned above, the arithmetic means is so designed as to detect the range error on the basis of frequency difference components having substantially same amplitudes in the adjacent range gates.

According to a second aspect of the present invention, there is provided an on-vehicle radar system installed on a motor vehicle, which system includes a transmitting means for radiating as a transmission wave a signal having a constant frequency after pulse modulation, a receiving means for receiving as a reception wave a reflection wave resulting from reflection of the transmission wave at a target in every range gate set at a same interval as a pulse width of the transmission wave, an arithmetic means for detecting a range extending from the motor vehicle to the target on the basis of the reception wave, and an operation mode changeover means for changing over operation mode of the transmitting means and the arithmetic means between a pulse operation mode and an FMCW operation mode based on the frequency-modulated continuous wave at an appropriate timing.

In the pulse operation mode, the transmitting means radiates the signal of the constant frequency while the arithmetic means determines a range extending from the motor vehicle to the target on the basis of the range corresponding to the range gate.

On the other hand, in the FMCW operation mode, the transmitting means radiates a modulated wave whose frequency repetitively increases and decreases while the arithmetic means determines the range extending from the motor vehicle to the target and a relative velocity of the target on the basis of a frequency difference between the frequency of the transmission wave and the frequency of the reception wave.

The arithmetic means is so designed as to compare the range corresponding to the range gate in the pulse operation mode with the range determined on the basis of the frequency difference between the frequency of the transmission wave and the frequency of the reception wave to thereby detect a range error due to aberration of modulation band width brought about by the frequency increasing and decreasing of the transmission wave in the FMCW operation mode.

The arithmetic means is so arranged as to detect the range error on the basis of frequency difference components having substantially same amplitudes in the adjacent range gates.

With the arrangements of the on-vehicle radar system described above, the range error is detected when the amplitudes of the beat frequency components ascribable to the target are substantially same in two adjacent range gates. By virtue of this feature, the detection accuracy of the range error can be enhanced by detecting the range error from the measurement data and correcting the same.

Further, occurrence of abnormal state in the on-vehicle radar system can be detected.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
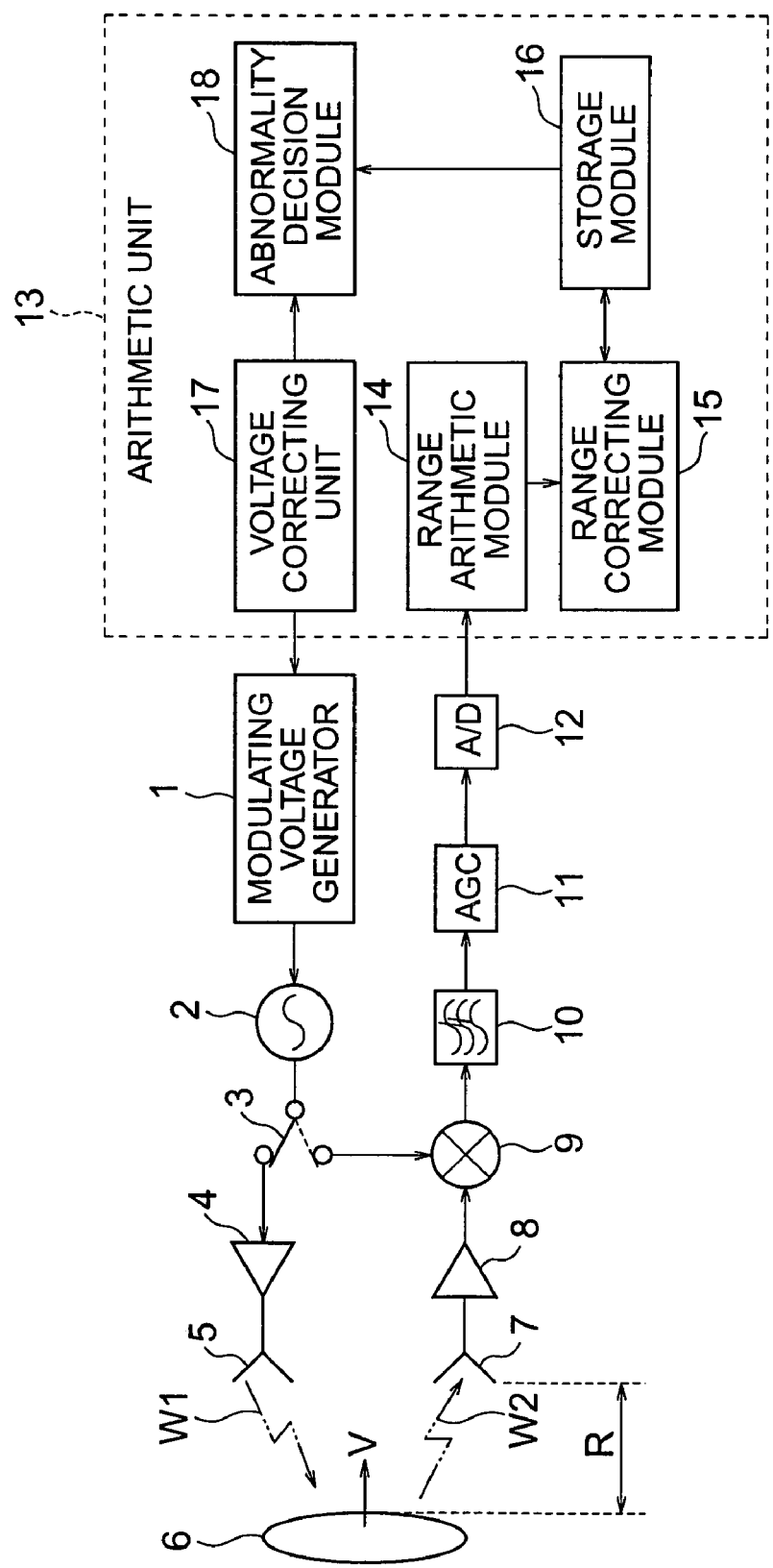
FIG. 1 is a block diagram showing generally and schematically a structure of the on-vehicle radar system according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing generally and schematically a structure of the on-vehicle radar system according to a first embodiment of the present invention.

Referring to FIG. 1, the on-vehicle radar system is designed for detecting the range to a target from the concerned motor vehicle (i.e., motor vehicle quipped with the radar system now under consideration) and comprised of a modulating voltage generator 1, a voltage-controlled oscillator 2, a transmission/reception changeover switch 3, a transmitting amplifier 4, a transmitting antenna 5, a receiving antenna 7, a receiving amplifier 8, a mixer 9, a low-pass filter 10, an AGC (Automatic Gain Control) amplifier 11, an A/D (Analog-to-Digital) converter 12 and an arithmetic unit 13.

In the concrete, the on-vehicle radar system shown in FIG. 1 is implemented on the basis of the FM pulse Doppler radar and differs from the conventional on-vehicle radar system with regard to the processing operations carried out by the arithmetic unit 13. In this connection, it should be mentioned that in the on-vehicle radar system according to the present invention, the vehicle velocity information is not used for the arithmetic determination of the range correcting value, and thus the vehicle velocity sensor is unnecessary for the operation of the arithmetic unit 13.

The modulating voltage generator 1, the voltage-controlled oscillator 2, the transmitting amplifier 4 and the transmitting antenna 5 cooperate to constitute a transmitting means for radiating as a transmission wave W1 a modulated wave having a frequency increasing and decreasing repetitively after pulse modulation.

On the other hand, the receiving antenna 7, the receiving amplifier 8, the mixer 9, the low-pass filter 10, the AGC amplifier 11 and the A/D converter 12 cooperate to constitute a receiving means for receiving as a reception wave W2 a reflection wave (echo signal) resulting from reflection of the transmitted wave W1 at a target 6 (object detected) in every range gate of which interval is same as the pulse width of the transmitted wave W1.

The arithmetic unit 13 serves as an arithmetic means for arithmetically determining a range error ascribable to aberration of the modulation band width brought about by the frequency increasing and decreasing of the transmission wave W1 by comparing the range corresponding to the range gate in the reception processing with the range determined on the basis of the frequency difference between the frequency of the transmission wave W1 and that of the reception wave W2.

The modulating voltage generator 1 is so designed as to generate a modulation control voltage while the voltage-controlled oscillator 2 being designed to generate an electromagnetic wave signal to be radiated or transmitted whose frequency is on the order of 76 GHz to 77 GHz under the control of the modulation control voltage.

The transmission/reception changeover switch 3 is designed to supply the electromagnetic wave power outputted from the voltage-controlled oscillator 2 exhangeably to either the transmitting amplifier 4 or the mixer 9 of the receiver.

The transmitting amplifier 4 serves to amplify the electromagnetic wave power for transmission while the transmitting antenna 5 radiates the amplified electromagnetic wave signal into space as the transmission (or transmitted) wave W1.

The receiving antenna 7 receives the electromagnetic wave signal reflected at the target 6 as the reception wave (echo signal) W2.

The mixer 9 mixes the received wave (reflected electromagnetic wave signal (or echo signal) amplified by the receiving amplifier 8 with the transmission electromagnetic wave signal to thereby output a beat signal conforming to the range R extending from the concerned motor vehicle to the target 6 and the relative velocity V of the target.

The low-pass filter 10 converts the cut-off frequency to a reciprocal of the transmission pulse time width while the AGC amplifier 11 adjusts the gain in dependence on the reception power of the reflection wave (echo signal).

The A/D converter 12 coverts the beat signal to the digital signal which is then inputted to the arithmetic unit 13.

The arithmetic unit 13 is composed of a range arithmetic module 14 to which the digital signal representing the value resulting from the A/D conversion performed by the A/D converter 12 (i.e., the output of the A/D converter 12) is inputted, a range correcting module 15 to which the range determined arithmetically by the range arithmetic module 14 (i.e., the output of the range arithmetic module 14) is inputted, a storage unit 16 in which data of the range errors determined arithmetically by the range correcting module 15 (i.e., data outputted from the range correcting module 15) are stored, a voltage correcting unit 17 for correcting the modulation control voltage for the transmission wave W1, and an abnormality decision module 18 for making decision as to occurrence of abnormal state.

In the arithmetic unit 13, the range arithmetic module 14 serves to calculate or compute the range R extending from the concerned motor vehicle to the target 6 and the relative velocity V thereof on the basis of the value resulting from the A/D conversion of the beat signal.

The range correcting module 15 serves to correct the range R computed by the range arithmetic module 14 on the basis of the range R and the relative velocity V computed by the range arithmetic module 14 and the information concerning the range gate which will be described in detail later on.

In this conjunction, the range correcting module 15 is so designed as to detect the range error on the basis of the frequency difference components having the substantially same amplitudes in the adjacent range gates.

Further, the range correcting module 15 is designed to compute a range correcting quantity on the basis of the range error to thereby correct the range R extending from the concerned motor vehicle to the target 6.

The range correcting module 15 may be so designed as to arithmetically determine or compute the range error on the basis of the data stored in the storage unit 16 as occasion requires.

More specifically, the range correcting module 15 deletes or erases from the data stored in the storage unit 16 those departed from a predetermined range of the range error data to thereby compute the range error on the basis of the remaining data.

Furthermore, the range correcting module 15 may also be so designed as to detect the range error only in the case where only one of the data of the frequency difference components having substantially same amplitudes exists in the adjacent range gates.

The voltage correcting unit 17 is designed to arithmetically determine a modulation control voltage correcting quantity on the basis of the range error computed by the range correcting module 15. The modulation control voltage correcting quantity is then inputted to the modulating voltage generator 1, whereby the modulation control voltage is corrected on the basis of the modulation control voltage correcting quantity.

The abnormality decision module 18 is designed to determine occurrence of abnormal state when the range error computed by the range correcting module 15 becomes greater than a predetermined quantity or when the modulation control voltage correcting quantity becomes greater than a predetermined quantity.

Next, referring to flow charts shown in FIGS. 2 and 3, description will be made of the processing operations carried out by the arithmetic unit 13 in the on-vehicle radar system according to the first embodiment of the present invention. Incidentally, it should be added that processing routine shown in FIGS. 2 and 3 is called from a main control processing procedure periodically at a predetermined interval.

Figure 2:
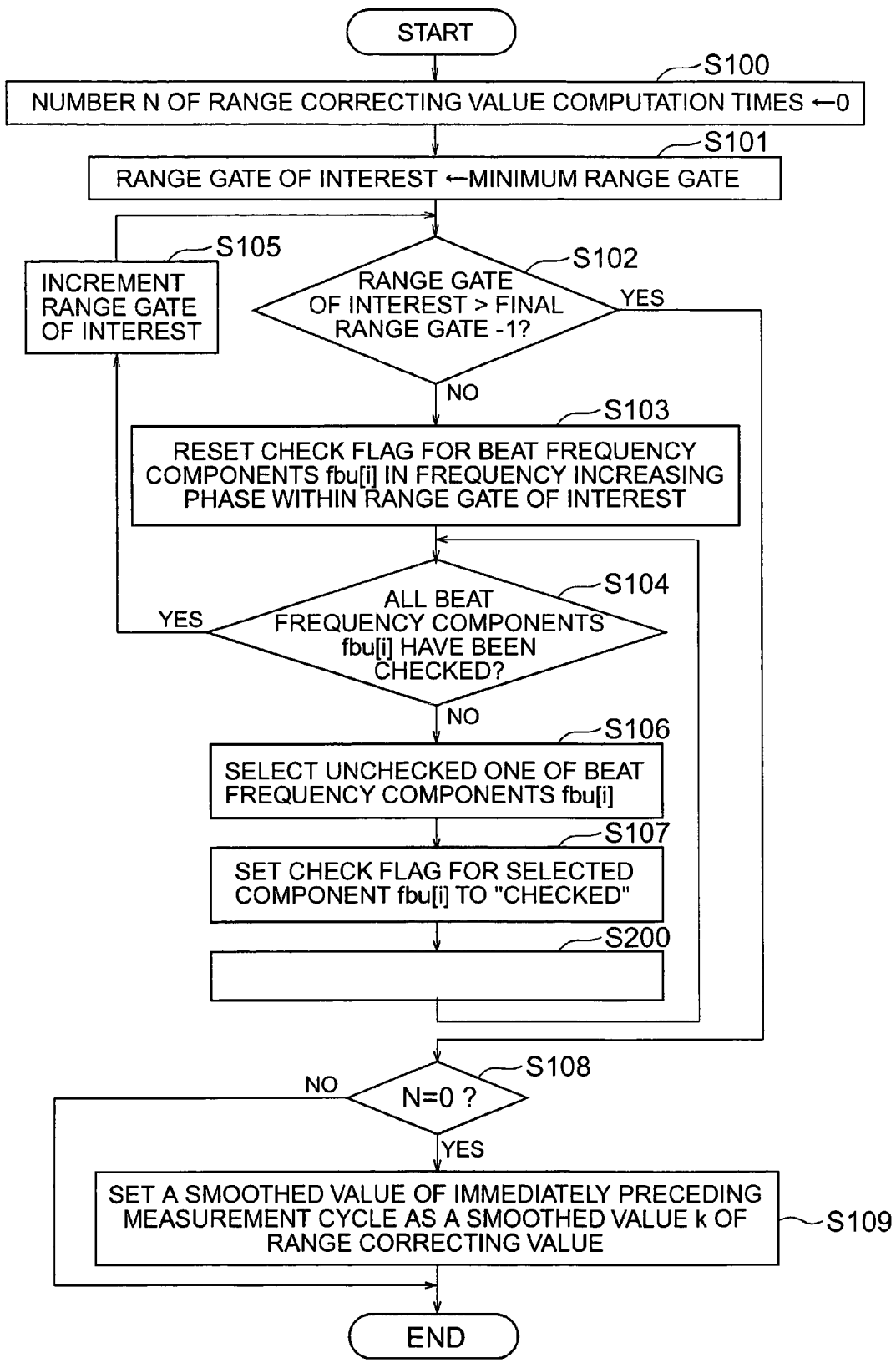
FIG. 2 is a flow chart for illustrating an arithmetic processing operation for arithmetically determining a range correcting value in the radar system according to the first embodiment of the present invention.
Figure 3:
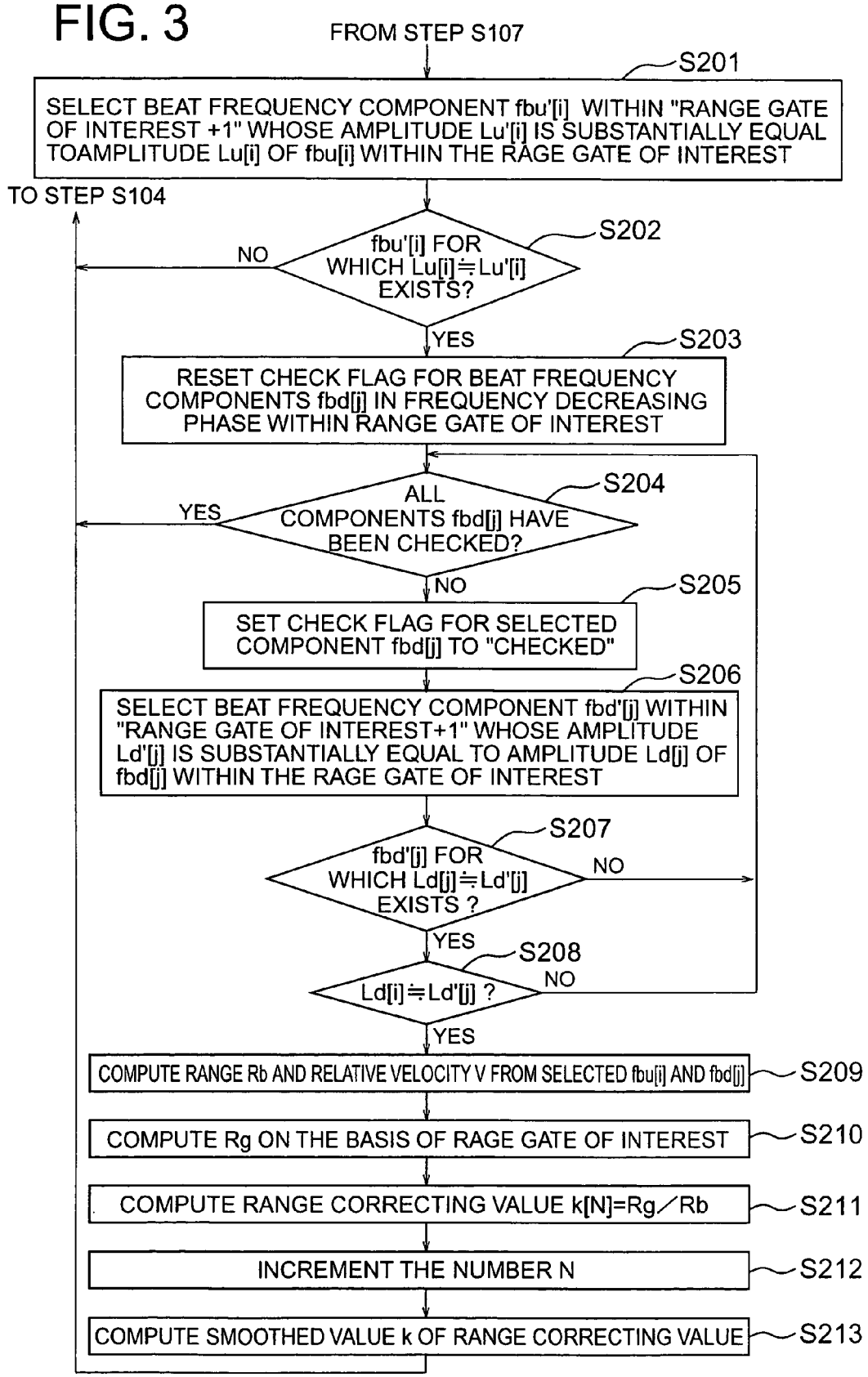
FIG. 3 is a flow chart for illustrating an arithmetic processing operation for arithmetically determining the range correcting value in the radar system according to the first embodiment of the present invention.

Referring to FIG. 2, the number N of times the range correcting value is computed is firstly initialized to "0" in a step S100.

Subsequently, in a step S101, a concerned one of the range gates (i.e., range gate of interest) is initialized to a minimum range gate.

In succession, decision is made as to whether or not the range gate of interest is greater than "(final range gate−1)" in a step S102. When it is determined that the range gate of interest is greater than the "final range gate−1" (i.e., when the decision step S102 results in affirmation "YES"), the procedure proceeds to a decision processing (step S108) described later on.

On the other hand, when it is determined that "range gate of interest"≦("final range gate"−1) in the step S102 (i.e., when the decision step S102 results in negation "NO"), the check flags for all the beat frequency components fbu[i] (i=0, 1, . . . ) in the frequency increasing phase within the range gate of interest are reset in a step S103.

In succession, decision is made whether or not all the beat frequency components fbu[i] in the frequency increasing phase have been checked in a step S104. When it is determined that all the beat frequency components have been checked (i.e., when the step S104 results in "YES"), the range gate of interest is incremented by "+1" in a step S105, whereupon return is made to the step S102.

On the contrary, when it is determined in the step S104 that unchecked component(s) remains in the beat frequency components fbu[i] in the frequency increasing phase (i.e., when the decision step S104 results in "NO"), one unchecked component is selected from the beat frequency components fbu[i] in a step S106.

Subsequently, the check flag for the one beat frequency component fbu[i] selected in the step S106 is set to "checked" in a step S107, whereon the arithmetic processing for arithmetically determining the range correcting value (see FIG. 3) is executed in a step S200, being then followed by the return to the step S104.

At this juncture, it should be added that when it is determined in the step S102 that "range gate of interest> final range gate−1" (i.e., when the decision step S102 is "YES"), then decision is made in a step S108 whether or not the arithmetic processing for arithmetically determining the range correcting value has been executed by making decision whether the number N of times the range correcting value has been computed is "0" or not.

When it is decided or determined in the step S108 that N=0 (i.e., when the decision step S108 is "YES"), the smoothed value of the range correcting values determined in the immediately preceding measurement cycle is set as the smoothed value k of the range correcting value in a step S109. Namely, the computed value in the immediately preceding measurement cycle is used, whereupon the processing routine shown in FIG. 2 comes to an end.

On the other hand, when it is decided in the step S108 that N>0 (i.e., when the step S108 is "NO"), the processing routine shown in FIG. 2 is terminated without executing the processing in the step S109 to resume the main control processing.

Next, by referring to FIG. 3, description will be directed to the arithmetic processing for arithmetically determining the range correcting value (step S200), which is executed in succession to the step S107 (see FIG. 2).

Referring to FIG. 3, in a step S201, the beat frequency component fbu'[i] is firstly selected for which the amplitude Lu[i] of the beat frequency fbu[i] in the frequency increasing phase in the range gate of interest as selected is substantially equal to the amplitude Lu'[i] of the beat frequency fbu'[i] in the frequency increasing phase within the gate range given by "range gate of interest+1".

In succession, it is decided whether the beat frequency component fbu'[i] for which the amplitudes Lu[i] and Lu'[i] in the adjacent range gates are substantially equal to each other exists or not (step S202).

Incidentally, the decision as to "Lu[i]≈Lu'[i]" is realized by deciding whether the condition "|Lu[i]−Lu'[i]|≦Δ Li" is satisfied or not, where ΔLi represents a predetermined value which may be set arbitrarily in dependence on the accuracy of decision as demanded.

When it is decided or determined in the step S202 that the beat frequency component fbu'[i] which satisfies the condition that "Lu[i]≈Lu'[i]" does not exist (i.e., when selection of the beat frequency component is impossible with the step S202 resulting in "NO"), the step S104 shown in FIG. 2 is resumed.

On the other hand, when it is decided or determined in the step S202 that the beat frequency component fbu'[i] which satisfies the condition that "Lu[i]≈Lu'[i]" exists (i.e., when selection of the beat frequency component is possible with the step S202 being "YES"), the check flags for all the beat frequency component fbd[j] (j=0, 1, 2, . . . ) in the frequency decreasing phase within the range gate of interest are reset (step S203).

In succession, decision is made as to whether or not all the beat frequency components fbd[j] in the frequency decreasing phase have been checked or not (step S204). When it is determined that all the components have been checked (i.e., when the step S204 results in "YES"), then return is made to the step S104 shown in FIG. 2.

On the contrary, when it is determined in the step S204 that unchecked component(s) exist(s) among the beat frequency components fbd[j] (i.e., when the step S204 is "NO"), the check flag(s) for the unchecked component(s) selected from the beat frequency components fbd[j] is set to "checked" in a step S205.

In succession, in a step S206, the beat frequency component fbd'[j] is selected for which the amplitude Ld[j] of the beat frequency fbd[j] in the frequency decreasing phase within the range gate of interest as selected is substantially equal to the amplitude Ld'[j] of the beat frequency fbd'[j] in the frequency decreasing phase within the range gate given by "range gate of interest+1".

Subsequently, it is decided whether or not the beat frequency component fbd'[j] for which the amplitudes Ld[j] and Ld'[j] in the adjacent range gates are substantially equal to each other exists (step S207). When it is determined that the beat frequency component fbd'[j] which satisfies the condition that "Ld[j]≈Ld'[j]" does not exist (i.e., when selection of the beat frequency component is impossible with the step S207 resulting in "NO"), then the step S204 described hereinbefore (see FIG. 3) is resumed.

By contrast, when it is determined in the step S207 that the beat frequency fbd'[j] which satisfies the condition that "Ld[j]≈Ld'[j]" exists (i.e., when selection is possible with the step S207 being "YES"), decision is then made in a step S208 as to whether or not the amplitudes Lu[i] and Ld[j] within the range gate of interest as selected are substantially equal to each other.

Incidentally, the decision as to "Lu[i]≈Ld[j]" is realized by deciding whether the condition "|Lu[i]−Ld[j]|≦ΔL" is satisfied or not, where ΔL represents a predetermined value which may be set arbitrarily in dependence on the accuracy of decision as demanded.

When it is determined in the step S208 that "|Lu[i]−Ld[j]|>ΔL" (i.e., when the step S208 results in "NO"), the step S204 is resumed, whereas when it is decided that "Lu[i]≈Ld[j]" (i.e., when the step S208 being "YES"), the range Rb to the target 6 and the relative velocity V of the same are computed on the basis of the selected beat frequency component fbu[i] and fbd[j] in accordance with the expressions (3) and (9) mentioned hereinbefore (step S209).

In succession, the range Rg is computed on the basis of the range gate of interest in accordance with the expression (2) mentioned hereinbefore (step S210) while the range correcting value k[N] is computed on the basis of Rg/Rb (step S211).

Further, the number N of times the range correcting value k[N] has been computed is incremented by "1" in a step S212, and the smoothed value k of the range correcting values is computed as an average value of the range correcting values k[N] in a step S 213, whereon the step S104 is resumed.

Next, referring to FIG. 4, description will be made of the coverage range concerned in the on-vehicle radar system according to the first embodiment of the present invention.

Figure 4:
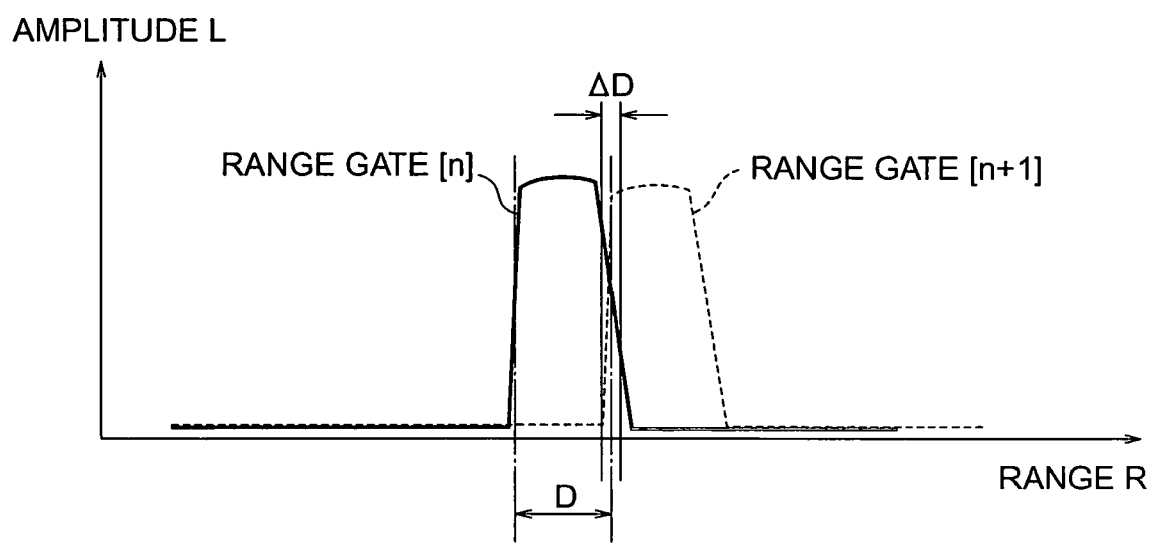
FIG. 4 is a view for illustrating change of amplitudes of beat frequency components brought about by a target in adjacent range gates when a range from a concerned motor vehicle to the target changes from "0" to "maximum detection range" in the radar system according to the first embodiment of the present invention.

FIG. 4 is a view for illustrating the change of the amplitude L of the beat frequency component as a function of the range R. More specifically, the changes of the amplitudes of the beat frequency components brought about by the target 6 in the range gates "n" and "n+1", respectively, when the range R from the concerned motor vehicle to the target 6 changes from "0" to "maximum detection range" are represented by a solid line curve and a broken line curve, respectively.

In the on-vehicle radar system according to the first embodiment of the present invention, consideration is paid to only the frequency components whose amplitudes are substantially same among the beat frequency components fbu[i] in the frequency increasing phase within the range gate of interest and the beat frequency components fbd[j] in the frequency decreasing phase within the range gate of interest. Refer to FIG. 4.

As can be seen in FIG. 4, the coverage range ΔD within which the amplitudes L are substantially equal in the adjacent range gates "n" and "n+1" can be restricted very narrowly when compared with range gate width D.

For this reason, by replacing the range Rg appearing in the expression (2) mentioned hereinbefore by a mid value of the coverage range ΔD within which the amplitudes L are substantially equal, the accuracy of the range Rg computed in the step S210 described previously (see FIG. 3) can be much enhanced when compared with the conventional on-vehicle radar system.

As a result of this, the accuracy of computation of the range correcting value k[N] and the smoothed value k of the range correcting values in the steps S211 and S213 mentioned previously is also remarkably enhanced as compared with the conventional on-vehicle radar system.

Additionally, for the arithmetic operation performed by the arithmetic unit 13, the velocity information of the concerned motor vehicle is rendered unnecessary, which in turn means that the vehicle velocity sensor is not required. Thus, the cost involved in implementing the on-vehicle radar system can be reduced.

Further, in the on-vehicle radar system according to the illustrated embodiment of the present invention, the beat frequency fbu[i] in the frequency increasing phase and the beat frequency fbd[j] in the frequency decreasing phase are selected in combination for one and the same target 6. To this end, the fact that the amplitudes Lbu[i] and Lbd[j] of the beat frequencies in the frequency increasing phase and the frequency decreasing phase, respectively, are substantially identical with each other is made use of according to the invention.

More specifically, only when the amplitudes Lbu[i] and Lud[j] of the beat frequency fbu[i] in the frequency increasing phase and the beat frequency fbd[j] in the frequency decreasing phase are substantially equal to each other, the range correcting value k[N] is computed in the step S211. In this manner, the range correcting value k[N] can be computed with very high accuracy.

Furthermore, upon selection of the beat frequency fbu[i] in the frequency increasing phase and the beat frequency fbd[j] in the frequency decreasing phase in combination for one and the same target 6, the range correcting value k[N] may be computed only when only one beat frequency component exists in each of the frequency increasing phase and the frequency decreasing phase within the range gate of interest, although not illustrated in FIG. 3.

Owing to this feature, the beat frequency fbu[i] in the frequency increasing phase and the beat frequency fbd[j] in the frequency decreasing phase can be combined with high reliability.

Furthermore, although the detection of the range error in the FM pulse Doppler radar has been described in conjunction with the first embodiment of the invention, the teaching of the present invention can equally be applied to the on-vehicle radar system which is designed to compare the range determined on the basis of the range gate when the target is detected with the range determined on the basis of the beat frequencies in the frequency increasing phase and frequency decreasing phase, respectively, by changing over the pulse operation mode and the FMCW mode based on the frequency-modulated continuous wave at an appropriate timing.

In that case, the electromagnetic wave signal of a constant frequency is radiated in the pulse operation mode to thereby determine the range R to the target 6 on the basis of the range corresponding to the range gate, whereon in the FMCW operation mode, the modulated wave whose frequency repetitively increases and decreases is radiated to thereby determine the range R and the relative velocity V on the basis of the frequency difference between the frequency of the transmission wave and the frequency of the reception wave.

The range corresponding to the range gate in the pulse operation mode is then compared with the range determined on the basis of the frequency difference between the transmission frequency and the reception frequency to thereby detect the range error brought about by variation of the modulation band width between the frequency increasing phase and the frequency decreasing phase of the transmission frequency in the FMCW operation mode.

To this end, the arithmetic unit 13 is so designed as to detect the range error on the basis of the frequency difference components exhibiting the substantially same amplitudes in the adjacent range gates through a procedure similar to that described hereinbefore.

As is apparent from the above, even in the on-vehicle radar system designed for detecting the range error, the range error detection accuracy can equally be enhanced.

As can now be understood from the foregoing, by taking into consideration the frequency difference components which assume the substantially same amplitudes in the adjacent range gates in the detection of the range error, detection accuracy of the range error can be enhanced.

Additionally, by arithmetically determining the range correcting value k[N] on the basis of the range error and correcting the range R to the target 6 by the range correcting value k[N], the range detection accuracy can further be improved.

Moreover, by arithmetically determining the modulation control voltage correcting quantity on the basis of the range error to thereby correct correspondingly the modulation control voltage by the voltage correcting unit 17, it is possible to improve the accuracy of modulation width of the transmission wave and that of the range detection.

Furthermore, by making decision as to the abnormal state of the on-vehicle radar system by the abnormality decision module 18 when the range error is greater than a predetermined quantity, reliability of the on-vehicle radar system can be improved.

Similarly, by making decision as to occurrence of abnormal state in the on-vehicle radar system by the abnormality decision module 18 when the modulation control voltage correcting quantity is greater than a predetermined quantity, reliability of the on-vehicle radar system can be improved.

Additionally, by storing the range error data in the storage unit 16 and arithmetically determining the range error on the basis of the stored data, detection accuracy of the range error can be improved.

Moreover, by storing the range error data and deleting the range error data deviated from a predetermined range of range error data to thereby arithmetically determine the range error on the basis of the remaining range error data, detection accuracy of the range error can further be improved.

Besides, by making use of only the data of the frequency error component in the case where only one data of the frequency difference component capable of making use of for detecting the range error that exists in the adjacent range gates, erroneous calculation of the range error quantity can be avoided.

Many features and advantages of the present invention are apparent from the detailed description and thus it is intended by the appended claims to cover all such features and advantages of the system which fall within the spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. An on-vehicle radar system, comprising:
 a transmitting means for radiating as a transmission wave a modulated wave having a frequency increasing and decreasing repetitively after pulse modulation;
 a receiving means for receiving as a reception wave a reflection wave resulting from reflection of said transmission wave at a target in every range gate set at a same interval as a pulse width of said transmission wave; and
 an arithmetic means for detecting a range error ascribable to aberration of modulation band width brought about by said frequency increasing and decreasing of said transmission wave by comparing a range corresponding to said range gate with a range determined on the basis of a frequency difference between a frequency of said transmission wave and a frequency of said reception wave,
 wherein said arithmetic means is designed to detect said range error on the basis of frequency difference components having substantially same amplitudes in adjacent range gates.

2. An on-vehicle radar system according to claim 1,
 wherein a range correction quantity is arithmetically determined on the basis of said range error to correct a range extending from said motor vehicle to said target.

3. An on-vehicle radar system according to claim 2, further comprising:
 an abnormality decision means for making decision as to occurrence of an abnormal state,
 wherein said abnormality decision means is designed to determine an occurrence of said abnormal state when said range error is greater than a predetermined quantity.

4. An on-vehicle radar system according to claim 1, further comprising:
a modulation control voltage correcting means for correcting a modulation control voltage for said transmission wave,
wherein said modulation control voltage correcting means is so designed as to arithmetically determine a modulation control voltage correcting quantity on the basis of said range error for thereby correcting said modulation control voltage on the basis of said modulation control voltage correcting quantity.

5. An on-vehicle radar system according to claim 4, further comprising:
an abnormality decision means for making decision as to occurrence of an abnormal state,
wherein said abnormality decision means is so designed as to determine an occurrence of said abnormal state when said modulation control voltage correcting quantity is greater than a predetermined quantity.

6. An on-vehicle radar system according to claim 1, further comprising:
a storage unit for storing data of range errors,
wherein said arithmetic means is so designed as to arithmetically determine said range error on the basis of data stored in said storage unit.

7. An on-vehicle radar system according to claim 6, wherein said arithmetic means is so designed as to eliminate from data stored in said storage unit range errors departing from a predetermined range and thereby arithmetically determining said range error on the basis of the remaining data.

8. An on-vehicle radar system according to claim 1, wherein said arithmetic means only detects said range error when one of the data of the frequency difference components having substantially same amplitudes in the adjacent range gates exists in the adjacent range gates.

9. An on-vehicle radar system, comprising:
a transmitter for transmitting a modulated wave having a frequency increasing and decreasing repetitively after pulse modulation;
a receiver for receiving a reflection wave resulting from reflection of said modulated wave from a target in every range gate set at a same interval as a pulse width of said modulated wave; and
a calculating component for detecting a range error by comparing a range corresponding to said range gate with a range determined on the basis of a frequency difference between a frequency of said transmitted modulated wave and a frequency of said reflection wave,
wherein said calculating component is programmed to detect said range error on the basis of frequency difference components having substantially same amplitudes in adjacent range gates.

10. The on-vehicle radar system according to claim 9, further comprising:
a modulating voltage generator outputting to a voltage control oscillator for generating said transmitted modulated wave; and
a voltage correcting controller for correcting the output of the modulating voltage regulator based on the range error,
wherein the calculating component corrects the range based on the range error.

11. The on-vehicle radar system according to claim 10, further comprising:
a storage device for storing data representing past range errors;
wherein the calculating component corrects the range based on at least one of the range error and the past range errors.

* * * * *